(12) United States Patent
Hayakawa et al.

(10) Patent No.: US 7,478,017 B2
(45) Date of Patent: Jan. 13, 2009

(54) METHOD OF DESIGNING OPTICAL SYSTEM

(75) Inventors: Kazuhito Hayakawa, Hachioji (JP);
Katsumi Motohashi, NishiTokyo (JP);
Shigeru Kato, Tachikawa (JP)

(73) Assignee: Olympus Corporation, Tokyo (JP)

( * ) Notice: Subject to any disclaimer, the term of this patent is extended or adjusted under 35 U.S.C. 154(b) by 260 days.

(21) Appl. No.: 10/554,389

(22) PCT Filed: Apr. 15, 2004

(86) PCT No.: PCT/JP2004/005417

§ 371 (c)(1),
(2), (4) Date: Oct. 25, 2005

(87) PCT Pub. No.: WO2004/097489

PCT Pub. Date: Nov. 11, 2004

(65) Prior Publication Data

US 2006/0200323 A1  Sep. 7, 2006

(30) Foreign Application Priority Data

Apr. 25, 2003  (JP) .............................. 2003-121817

(51) Int. Cl.
G06F 17/10  (2006.01)
(52) U.S. Cl. .................. 703/2; 703/1; 700/97
(58) Field of Classification Search ...... 703/1, 703/2, 6; 348/335; 702/2; 700/97, 120
See application file for complete search history.

(56) References Cited

U.S. PATENT DOCUMENTS 5,067,067 A * 11/1991 Estelle et al. ................. 700/36
6,885,908 B2 * 4/2005 Yoshida et al. .............. 700/191
6,895,334 B2 * 5/2005 Yabe .............................. 702/2
2003/0184669 A1 * 10/2003 Nishioka et al. ............ 348/335

FOREIGN PATENT DOCUMENTS

| JP | 11-030746 | 2/1999 |
| JP | 11-223764 | 8/1999 |

(Continued)

OTHER PUBLICATIONS

Liu et al., Optimal Binary Image Design Based on the Branch and Bound Algorithm, IEEE, 1990 Int. Conf. on Acoustics, speech, and Signal Processing, Apr. 1990, pp. 1877-1880.*

(Continued)

*Primary Examiner*—Russell Frejd
(74) *Attorney, Agent, or Firm*—Pillsbury Winthrop Shaw Pittman LLP (57) ABSTRACT

The design method of the optical system according to the present invention comprises a step (S1) for setting an optical parameter in a design state in which a production error has not been taken into consideration, a step (S2) for making/renewing a production state where an optical parameter in a production state is made by adding the production error to the optical parameter in the design state, or the production error of the optical parameter in an existing production state is renewed, a step (S3) for making an evaluation function which makes the evaluation function and a step (S4) for performing optimization which determines an optimal optical parameter by optimizing the evaluation function.

12 Claims, 5 Drawing Sheets

FOREIGN PATENT DOCUMENTS

| | | |
|---|---|---|
| JP | 11-223769 | 8/1999 |
| JP | 11-316338 | 11/1999 |
| JP | 3006611 | 11/1999 |
| JP | 2002-048673 | 2/2002 |
| JP | 2002-267926 | 9/2002 |

OTHER PUBLICATIONS

International Search Report for International Application No. PCT/JP2004/005417, filed Apr. 15, 2004.

* cited by examiner

METHOD OF DESIGNING OPTICAL SYSTEM

CROSS REFERENCE TO RELATED APPLICATIONS

This is the U.S. National Phase of International Application No. PCT/JP2004/0054 17, filed Apr. 15, 2004, which relies for priority upon Japanese Patent Application No. 2003- 121817, filed on Apr. 25, 2003, the contents of both of which are incorporated herein by reference in their entireties.

TECHNICAL FIELD

The present invention relates to a design method of an optical system that is especially suitable for performing in a design processing apparatus, such as a computer and the like. It also relates to a recording medium in which a design program of an optical system is recorded, an optical system and an optical apparatus designed using a design method of an optical system or a design program of an optical system.

BACKGROUND ART

Conventionally, as a design method of an optical system, the steepest descent method, the conjugate gradient method, the least-squares method, etc. have been used. Each of these methods is called an optimization technique, and an evaluation function having two or more variables is used.

When these optimization techniques are used for a design of an optical system, what is equivalent to a variable of an evaluation function is an evaluation parameter (or an evaluation criteria), for example, such as aberrations and the like. This evaluation parameter is computed based on the value of the optical parameter (or composition) of optical systems, such as a radius of curvature of an optical action surface, a surface interval, and a refractive index. Therefore, if a value of the optical parameter of an optical system is changed, a value of an evaluation parameter changes, and change of the value of an evaluation parameter changes a value of an evaluation function.

Then, by changing gradually a value of an optical parameter of an optical system, processing for calculating the optimal value (for example, the minimum value and the minimal value) of an evaluation function is carried out.

Thus, when an optimal value of an evaluation function is obtained, an optical system having the optimal combination of a value of each optical parameter of the optical system at that time will be expressed. As a result, a value of an optical parameter of the optical system nearest to an intention of a designer is obtained. In addition, in case that an optimal value of an evaluation function is calculated, processing which an evaluation parameter also brings close to desired targeted value simultaneously is carried out.

In this way, in a design of an optical system, an optical parameter of the optical system that an evaluation function serves as the optimal value, and an evaluation parameter reaches in target tolerance level is determined.

For example, in order to reduce change of performance of an optical system by a production error adding some correction to a design value, and applying a limitation to the number of variables for optimization, etc. have been made. Such correction and limitation are carried out by a designer's own handwork. This handwork is carried out based on know-how and the like such as a design value obtained by computer, knowledge and experience of thea designer.

However, in recent years new design methods of an optical system have been proposed by, for example, Japanese published unexamined patent application Toku Kai Hei 11-30746, Japanese published unexamined patent application Toku Kai Hei 11-223764, Japanese published unexamined patent application Toku Kai Hei 11-223769, Patent No. 3006611, Japanese published unexamined patent application Toku Kai 2002-267926,etc.

DISCLOSURE OF THE INVENTION

In order to attain the purpose mentioned above, a design method of an optical system according to the present invention, in the design method of an optical system using an evaluation function, comprises a step for setting an initial value which sets up an optical parameter in a design state where a production error has not been taken into consideration, a step for making the evaluation function which makes the evaluation function, and a step for performing optimization which determines an optimal optical parameter by optimizing the evaluation function.

The design method of the optical system of the present invention is constituted such that in the step for making for the production state•renewing,
a quantity of the production error to be applied is acquired, based on a value in a table of an amount of error which has been established beforehand according to a requirement for acquisition of an amount of a production error, the amount of the error is applied to an optical parameter in the design state, and thus an optical parameter in the production state is newly made, or a value of the amount of error which has been applied to the optical parameter in the existing production state is renewed according to change of the optical parameter in the design state.

In the design method of the optical system of the present invention, in the step for making an evaluation function, at least one production error sensitivity parameter determined based on the optical performance of the design state and a production state is included as an evaluation parameter, in addition to the evaluation parameter of the evaluation function.

According to the design method of the optical system of the present invention, it is suitable for use of computer, wherein various kinds of aberrations etc. can be corrected and change of performance of the optical system owing to a production error is hard to occur. Thus, an optical system can be designed efficiently. Therefore, a design of an optical system can be efficiently carried out.

Other purposes, features, and advantages of the present invention than these mentioned above will become clear by the following detailed explanation with reference to accompanying drawings.

BEST MODE FOR CARRYING OUT THE INVENTION

Prior to explaining embodiments of the present invention, two different states used in an optical design of the present invention will be explained.

In a stage of a preliminary design of an optical system, as for optical parameters, such as a radius of curvature of an optical action surface which constitutes an optical system, a lens thickness and an air space interval, generally, only a case where an actual optical system could have been made completely without any error is assumed. In the present invention, a state of an ideal optical system without any error is called a design state. This design state is a state where the optical system consists of predetermined optical parameters. Such predetermined optical parameters are optical parameters obtained by such premise that any production error does not generate.

On the other hand, in an actual optical system, a value of an optical parameter which constitutes the optical system becomes a different value from that in a design state by a production error. Therefore, there is a case that a performance of an optical system differs from a performance in the design state. Thus, in the design stage, it is necessary to take into consideration of a performance different from that in the design stage. Therefore, a production error is given to at least one optical parameter among optical parameters in the design state. Thus, a state in which a composition of the optical system has been slightly changed from the design state is set up. In the present invention, this state is called a production state.

In the production state, it is desirable that for all actual production errors can be reproduced. That is, it is ideal that all errors are given to optical parameters in the design state. However, it is unrealistic that all errors having distribution are given (reproduced) comprehensively. Then, a central value based on actual production capacity as an amount of error $\delta$ given to an optical parameter is used. As for an errors to be given to a specific optical parameter A, two kinds of errors, $A+\delta$ and $A-\delta$ can be considered.

Therefore, the amount of error to be given is good enough at either $A+\delta$ or $A-\delta$. As a matter of course, if both of $A+\delta$ and $A-\delta$ are given, it goes without saying that the influence of an error can be more exactly taken into consideration.

Further, as for making of a production state the following two cases can be considered. One is a case where one kind of production errors is given to one optical parameter, and one production state is made. Such example will be shown below. Here, a, b, c and d are production errors, a kind of which differs, respectively.

a production state A=an optical parameter in a design state A+ a production error a a production state B=an optical parameter in a design state B+ production error b a production state C=an optical parameter in a design state C+ a production error c a production state D=an optical parameter in a design state D+ a production error d.

For example, when an optical parameter A is a radius of curvature, a production error a is Newton number (lines). Further, when optical parameter B is a thickness of a lens, a production error b is a thickness error. In this case, an evaluation function F becomes an evaluation function F (production state A, production state B, production state C, production state D). In this case, since change of an optical performance by each error can be grasped, it is suitable for elucidation of a phenomenon.

Another is a case that two or more kinds of production errors are given to one optical parameter, and one production state is made. Such example will be shown below. Here, a, b, c, and d are production errors, a kind of which differs, respectively.

a production state X=an optical parameter in a design state A+ a production error a+ production error a'+ an optical parameter B+ a production error b a production state Y=an optical parameter in a design state C+ a production error c+ an optical parameter in a design state D+ a production error d For example, when an optical parameter A is a radius of curvature, a production error a is Newton number and a production error a' is astigmatism. Further, when optical parameter B is a thickness of a lens, a production error b is a thickness error.

In this case, an evaluation function F becomes an evaluation function F (a production state X, a production state Y). In this case, change of an optical performance generated by overlapping an error in two or more optical parameters can be grasped. As mentioned above, total number of production states can be suppressed at few number, compared with a case where a production state is made for every kind of each of production errors. A method which is used for creating a production state is determined by a specification of the optical system to be designed, a degree of the influence by an error, etc. Namely, a designer can just choose one of methods by own judgment. Otherwise, an optical design can also be carried out by making an evaluation function of both and using the evaluation function combined, for example, as an evaluation function F (a production state A, a production state X) etc.

Next, embodiments of the present invention will be explained for every step.

Figure 1:
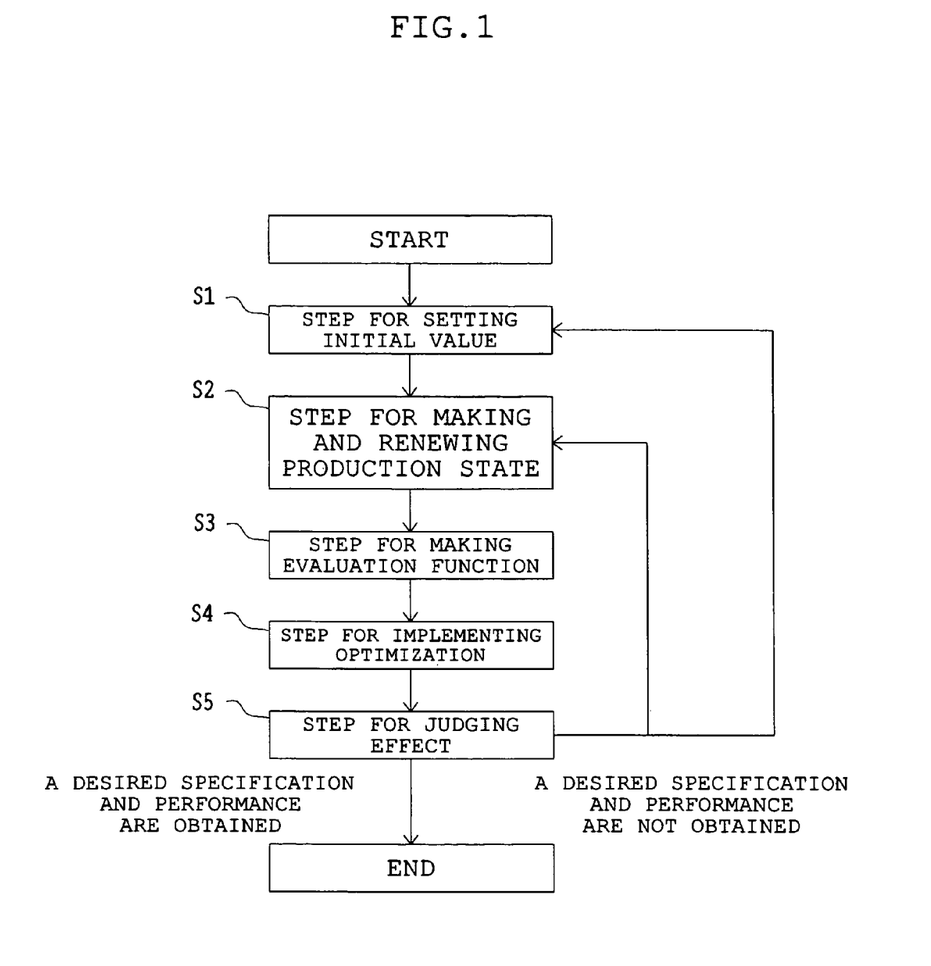
FIG. 1 is a flow chart showing whole design procedure of a first embodiment of a design method of an optical system according to the present invention.

FIG. 1 is a flow chart of a design method showing one of embodiments of the design method of an optical system. The design method of the optical system of the present invention comprises a step for setting an initial value (Step S1), a step for making of production state/renewing, a step for making of an evaluation function (Step S3), a step for performing of an optimization (Step S4) and a step of an effect judging (Step S5).

First, the step for setting an initial value (Step S1) will be explained. In a step for setting an initial value, a designer sets up a value of an optical parameter in a design state. As this value of the optical parameter, a value of an optical parameter of the optical system designed in the past can be used. Otherwise, the value of an optical parameter can be set up, based on data of a new optical system obtained by carrying out an optical design.

Next, a step for making/renewing of production state (Step S2) will be explained. At this step, an amount of error to be given to the value of the optical parameter in the design state is determined. Here, a point of features is that this amount of error is not a value such that a designer may determine arbitrarily, but a value determined, based on a production capacity of the optical system.

In the present embodiment, in order to obtain this amount of error to be given, a table of an amount of error is prepared beforehand. This table of an amount of error is made based on requirements for acquisition of production error. Moreover, a value of the data of this table of an amount of error is determined by taking into consideration of a production capacity etc.

In the present invention, requirements for acquisition of production error means the following three.

(1) Kinds of Production Errors which Should be Given:

For example, Newton error (Newton number), astigmatism, a wall thickness error, a lens interval error, a shift eccentricity, a tilt eccentricity, etc.

(2) Kinds of Optical Parameters in a Design State:

For example, a radius of curvature of an optical action surface or a lens surface, a lens thickness, a lens interval, an outer diameter, etc.

(3) Conditions by the Value of Optical Parameters:

For example, a range of the value of the optical parameter where the amount of errors to be given can become the same value is divided by condition.

However, there is a case that numerical conditions of the optical parameter does not exist, where an amount of error cannot be determined by only condition (1) or (2)

For example, a table of an amount of error of a radius of curvature is shown in Table 1. Here, the kinds of production error are Newton error and astigmatism. An optical parameter is a radius of curvature. Moreover, conditions of numerical values of the optical parameter is divided into five, and ranges of the value of the optical parameter used as each of conditions are shown in the following table 1.

TABLE 1

| | radius of curvature of a design state r | | | | |
|---|---|---|---|---|---|
| | r < \|10\| | \|10\| ≦ r < \|100\| | \|100\| ≦ r < \|500\| | \|500\| ≦ r < \|1000\| | \|1000\| ≦ r |
| Newton(lines) | 7 | 7 | 10 | 15 | 20 |
| astigmatism (lines) | 5 | 6 | 8 | 10 | 15 |
| ... | ... | ... | ... | ... | ... |

In Table 1, the radius of curvature of a design state is divided by five numerical value ranges. The number of Newton and the number of astigmatism are set up about each of the numerical value ranges. In the design method of the optical system of the present invention, a design is carried out with reference to this table of an amount of error. That is, a amount of error to be given to a value of the optical parameter of a design state is acquired from this table of an amount of error. Then, the acquired amount of error is given to the value of the optical parameter of the design state, and a value of the optical parameter in a production state is newly made. In this case, a step for making/renewing of production state becomes a step for making a production state.

Otherwise, it can also change into a new amount of error in the course of designing of an optical system. If an optical system is further designed in the first production state, the value of the optical parameter will change. For example, it is assumed that a value of a radius of curvature (optical parameter) that has been 90 in the first production state changes to 120. In this case, a amount of error of Newton number (production error) is renewed from seven to ten, based on the error table of Table 1.

Thus, based on the table of an amount of error, the amount of error given to the value of the optical parameter in the existing production state is renewed or changed. In this case, a step of making/renewing of production state becomes a step which renews a production state.

Values of a table of an amount of error have been determined based on an actual production capacity. Therefore, if design is carried out using such table of an amount of error, it will become easy to obtain an optical system corresponding to the actual production capacity. This is desirable, since an amount of error is automatically determined based on the table of an amount of error, and a design can be efficiently carried out.

Furthermore, more than one kind of table of an amount of error can be used. It is good to make many kinds of table of an amount of errors for making a synoptic table. Thus, by this way, a designer can give an amount of error while referring to the synoptic table. It is good to constitute as an error database (hereinafter it is abbreviated by Error DB) by recording on a computer. In this way, it will become unnecessary for a designer to consider a suitable amount of error each time. Thus, a design of an optical system can be efficiently made.

Furthermore, it is desirable that programming of the step of making/renewing of production state of the present embodiment is made. In this way, it will become a step available in an optical design software (hereinafter, it is abbreviated by Optical CAD). Optical CAD is one of design tools available on a computer. Therefore, the step mentioned above is incorporable into Optical CAD. In this way, an amount of error is acquired from Error DB, and by using this amount of error; a production state can be newly made on an optical design tool. Or, an existing production state can be renewed. As a result, it is possible to process automatically from acquisition of an error to making and renewing of a production state. Thus, a design of an optical system can be efficiently made further.

As a making method of a production state, there is a method in which an production error is given to two and more optical parameters, and one production state is made. In this case, as for a step of making/renewing of production state of the present embodiment, it is desirable to carry out it as follows.

First, a designer chooses at least one kind of evaluation parameters to which the designer-self pays attention. And the kind of production error given to an optical parameter is chosen. Then, an amount of error is given to a value of the optical parameter of a design state based on a table of an amount of error.

In that case, an amount of error is chosen from the table of an amount of error so that a value of this selected evaluation parameter may become the worst.

It is because a value of plus and a value of minus ($+\delta$, $-\delta$) as an amount of error to be given can be chosen. Therefore, there is a possibility that some combination may eliminate an influence of a production error as a whole. That is, although an amount of error is given, it will be in a production state that there is no influence of the production error. Then, it is made for a value of an evaluation parameter to become the worst. In this way, a case in which an influence of a production error is overlooked by canceling an influence with a production error owing to some combination of an amount of error to be given can be eliminated.

Furthermore, as for the making of production state and renewing stare of this enforcement form, it is desirable preferably to constitute the amount of error given to the value of an optical parameter so that it may set up automatically. In this case, it is good to combine Optics CAD and Error DB.

When a basic design by Optics CAD is completed, a design state is obtained. At this time, a value of the optical parameter of a design state is stored in a memory of a computer. Therefore, if the value of the memory is referred to, an amount of error can be acquired from Error DB. In this way, an amount of error given to the value of an optical parameter can be automatically chosen from the table of an amount of error. Thus, a design of an optical system can be efficiently made further since it becomes possible to carry out automatically from acquisition of an error to a making/renewing of a production state. When an amount of error is given, based on a table of an amount of error, processing for checking that a value of a desired evaluation parameter may become the worst is set to be carried out simultaneously.

Next, an evaluation function making step (Step S3) and an optimization implementation step (Step S4) will be explained altogether. First, an evaluation function is explained. Generally, in a design method of an optical system using an evaluation function, the evaluation function consists of, at least, one evaluation parameter. Each of evaluation parameters consists of an amount of evaluation, a weight, etc., such as an optical performance and the like. As an amount of evaluation of the optical performance, there is such a thing that is an aberration determined by the optical parameter. As for the weight, a designer determines the weight of an amount of evaluation in the whole evaluation function.

For example, when an evaluation function is set to F, an evaluation parameter is set to Pi, a desired value of an evaluation parameter is set to Qi, and an assigned weight of an evaluation parameter is set to Wi, the evaluation function F can be expressed as follows:

$$F = \Sigma Wi(Pi-Qi)^2$$

As an evaluation parameter here, specification, performance, and the like of an optical system expressing an optical performance, such as various aberrations and a focal length of the optical system, can be used. In an optical design, such evaluation function is made. Then, optimization is carried out to this evaluation function. By this optimization, a combination of the optimal optical parameter can be determined. A design of an optical system is implemented by carrying out such processing. Here, the purpose of optimization is to obtain a value of an optical parameter which is closer as much as possible to a target performance and specification by using a given evaluation function. As for a method of optimization, various kinds of methods, such as method of least squares, etc. mentioned above have been known. However, as for method of optimization used in the design method of the optical system of the present invention, any of known methods can be used. Here, an explanation of concrete contents of the method of optimization is omitted, since it is not directly related to the present invention.

In the design method of the optical system of the present invention In addition to evaluation parameters such as an optical performance in a design state, etc. that have been used so far, new evaluation parameter is introduced. This new evaluation parameter is a production error sensitivity parameter. This production error sensitivity parameter consists of an optical performance of a production state, etc. In the present embodiment, this production error sensitivity parameter is introduced so as to carry out optimization.

The production error sensitivity parameter X in the present embodiment is an evaluation parameter which consists of an optical performance $y_0$ in a design state, and an optical performance $y_i$ in a production state. This is a quantity that can be generally expressed as follows by using an arbitrary function F.

$$X = F(y_0, y_i)$$

As an example, a method for obtaining a production error sensitivity parameter from states which are a design state $N_o$, and production states $N_1$ and $N_2$ will be explained. Here, a method how to obtain based on quality engineering will be explained. As to a design state $N_o$, optical performances $y_{01}$, $y_{02}$ ---, $y_{0k}$ in conditions of 1, 2, ---, k, are determined. Next, also as to production states $N_1$ and $N_2$, optical performances $y_{11}$ and $y_{12}$, ---, $y_{1k}$, $y_{21}$ and $y_{22}$, ---, $y_{2k}$ are determined similarly. This list is shown in Table 2.

TABLE 2

|  | 1 | 2 | ... | k |
|---|---|---|---|---|
| $N_0$ | $y_{01}$ | $y_{02}$ | ... | $y_{0k}$ |
| $N_1$ | $y_{11}$ | $y_{12}$ | ... | $y_{1k}$ |
| $N_2$ | $y_{21}$ | $y_{22}$ | ... | $y_{2k}$ |

As an optical performance here, there are aberration, spot RMS and MTF, a light intensity, etc. As a condition, FNO, NA, object distance, an image height, etc. are mentioned.

Now, after making such data table, the following various kinds of parameter are calculated. As to meanings of the parameters, since they have been explained in literatures of general quality engineering in full detail, such explanation is omitted here.

$$L1 = \Sigma y_{0j} y_{1j} = y_{01} y_{11} + y_{02} y_{12} + \ldots + y_{0k} y_{1k}$$

$$L2 = \Sigma y_{0j} y_{2j} = y_{01} y_{21} + y_{02} y_{22} + \ldots + y_{0k} y_{2k}$$

$$r = \Sigma y_{0j}^2 = y_{01}^2 + y_{02}^2 + \ldots + y_{0k}^2$$

$$S_T = \Sigma \Sigma y_{ij}^2 = y_{11}^2 + y_{12}^2 + \ldots + y_{1k}^2 + y_{21}^2 + y_{22}^2 + \ldots + y_{2k}^2$$

$$S_\beta = (L1+L2)^2/2r$$

$$S_{N \times \beta} = (L1^2 + L2^2)/r - S_\beta$$

$$S_e = S_T - S_\beta - S_{N \times \beta}$$

$$f_e = 2k - 2$$

$$f_N = 2k - 1$$

$$V_e = S_e/f_e$$

$$V_N = (S_{N \times \beta} + S_e)/f_N$$

$$X = 10 \log\{(S_\beta - V_e)/V_N\}$$

From the parameters mentioned above, a production error sensitivity parameter X can be calculated as follows.

$$X = 10 \log\{(S_\beta - V_e)/V_N\}$$

This production error sensitivity parameter expresses a stability of a production error, and has a characteristic in which a value becomes large to an extent that it is hard to be influenced by production. Thus, when the production error sensitivity parameter is used, a level of the influence of the production error can be easily grasped, and accordingly a design can be efficiently carried out. Here, the production error sensitivity parameter shows a level of the influence of the production error from a design state and a production state.

Now, an evaluation function incorporating a production error sensitivity parameter is set to F'. Then, by including the evaluation function F explained previously, an evaluation function F' is newly made as follows:

$$F' = F + \Sigma wj(Xj - Yj)$$

wherein Xj is a production error sensitivity parameter, Yj is a desired value of the production error sensitivity parameter. wj is a weight assigned to the production error sensitivity parameter.

When such evaluation function F' is made, in a state including the influence of a production error, optimization of an optical system can be carried out. As a result, an optical parameter which cannot be easily influenced of a production error can be obtained efficiently.

Furthermore, an evaluation function is incorporate in a program so that it can be processed on a computer. Then, each step is constituted so that optimization may be carried out by the computer. In this way, an optical system can be designed more efficiently.

Finally, in a step for judging effect (Step S5), whether the desired specification, the desired engine performance, etc. are satisfied in the optical system obtained by the optimization is judged. Here, the design will be ended if the optical system has such desired specification and performance. On the other hand, when that is not the case, it returns to the step for making/renewing of production state, or a step for setting an initial value. Then, the design processing of an optical system is repeated.

Next, embodiments of the present invention will be explained using drawings.

First Embodiment

FIG. 1 shows a first embodiment of a design method of an optical system. Here, a flow chart showing whole design procedure is shown.

In the design method of the optical system of this embodiment, firstly, in a step for setting an initial value (Step S1), a value of an optical parameter in a design state is set up. A production error is not taken into consideration in this design state.

Next, in the step of a making/renewing of production state an amount of error of the production error is given to the value of the optical parameter of the design state. Or, instead of the amount of error to which the value of the optical parameter in a production state has been given, a new amount of error is given. In this case, it becomes renewing of an amount of error. By this, the value of an optical parameter in the production state is set up (Step S2). This amount of error is determined automatically by referring to Error DB.

Next, in an evaluation function making step, a kind of evaluation parameter of an evaluation function is determined so that a desired specification and performance may be satisfied. In this case, the desired value and assigned weight are given. By such way, an evaluation function is determined (Step S3).

Next, in a step for performing optimization, the optimization is carried out based on a predetermined evaluation function. Then, an optimal optical parameter for an evaluation function is determined (Step S4). Here, the evaluation function is made in the step for making the evaluation function (not illustrated).

Next, in a step for judging effect, From the optical parameter obtained by the a step for performing optimization, it is judged whether the specification and the performance of the optical system are the desired specification and performance (Step S5). In the effect judging step, when the optical parameter used as the desired specification and performance has been obtained, the design of the optical system is terminated. On the other hand, when the desired specification and performance have not been obtained, it returns to the step of making/renewing of production state, while keeping with the present optical parameter. If it returns to the step of making/renewing of production state, the amount of error of the optical parameter in the production state will be renewed. Then, design processing continues by a renewed amount of error. When it is necessary that a certain change is given to a value of the optical parameter of a design state, it returns to the step for setting an initial value.

According to the design procedure of the optical system of the first embodiment, an optical design can be carried out efficiently, taking a production error into consideration. As a result, an optical system with little influence of a production error can be obtained easily. Moreover, yield rate can be improved and production cost can be held down.

Second Embodiment

Figure 2:
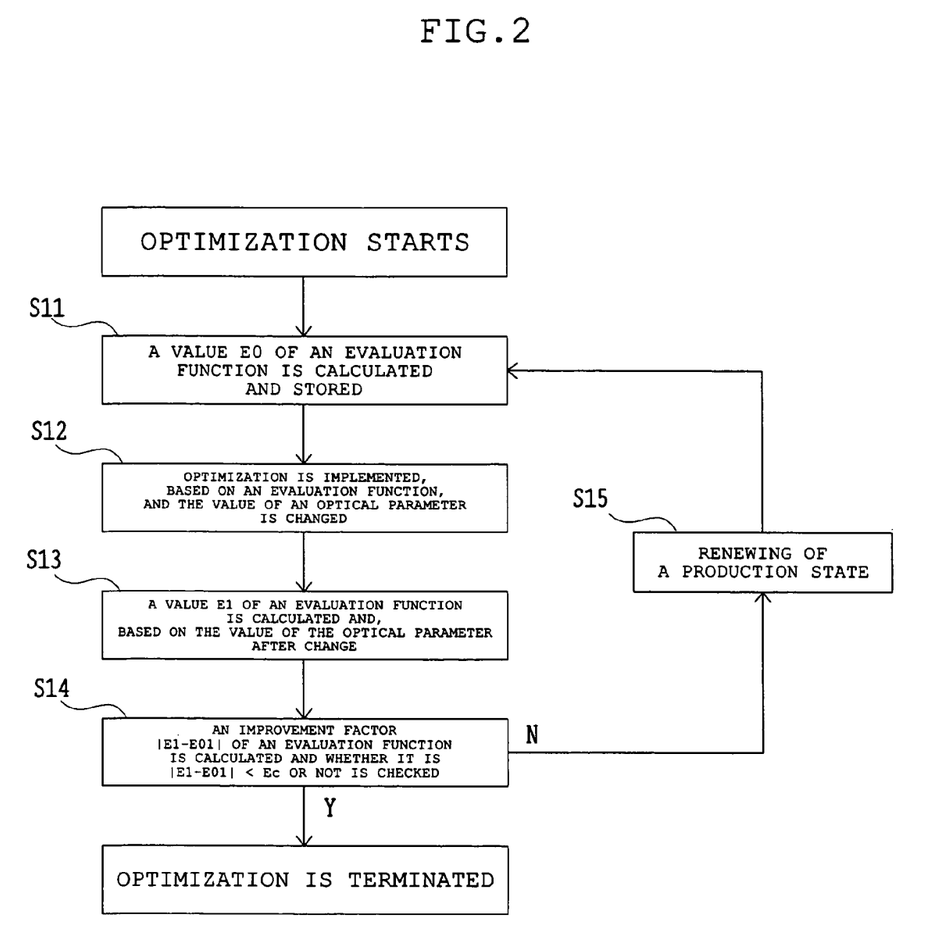
FIG. 2 is a flow chart showing a concrete processing procedure of an optimization implementation step of a second embodiment of a design method of an optical system according to the present invention.

FIG. 2 shows a second embodiment of a design method of an optical system. Here, a concrete procedure of a step for performing optimization is shown by a flow chart.

In the step for performing optimization of this embodiment, firstly the value E0 of an evaluation function is calculated and memorized, based on the value of the optical parameter set up (Step S11). Then, the optimization is performed, based on the evaluation function, and the value of an optical parameter is changed and set up (Step S12). Next, a value E1 of the evaluation function is calculated and memorized, based on the value of the optical parameter after change (Step S13).

Next, from values E0 and E1 of the evaluation function memorized, an improvement factor $\Delta E=-E1-E01$ of the evaluation function is calculated (Step S14). Here, $\Delta E$ is an index for judging how much the evaluation function has been improved from a state in which optimization has not yet been performed. This index $\Delta E$ shows whether it approaches to an optimal optical system for the evaluation function or not. At Step S14, it is judged whether the improvement factor is larger than a standard value Ec for judgment set up beforehand.

In case that the improvement factor index $\Delta E$ is smaller than the standard value Ec for judgment set up beforehand, namely, it is assumed that it is $\Delta E<Ec$. In this case, even if optimization is carried out furthermore it is judged that it does not lead to a remarkable improvement of the evaluation function, and accordingly optimization is terminated.

On the other hand, in case that the improvement factor index $\Delta E$ is smaller, than the standard value for judgment Ec set up beforehand, that is, it is assumed that it is $\Delta E \geq Ec$. In this case, a production state is renewed (Step S15). Then, it returns to step S11 and the same processing as henceforth is repeated. After the step S14, only the renewing portion of a production state is used.

According to the procedure for performing optimization of the second embodiment, an amount of error suitable for the optical parameter which changes in an optimizing stage can be given.

Third Embodiment

Figure 3:
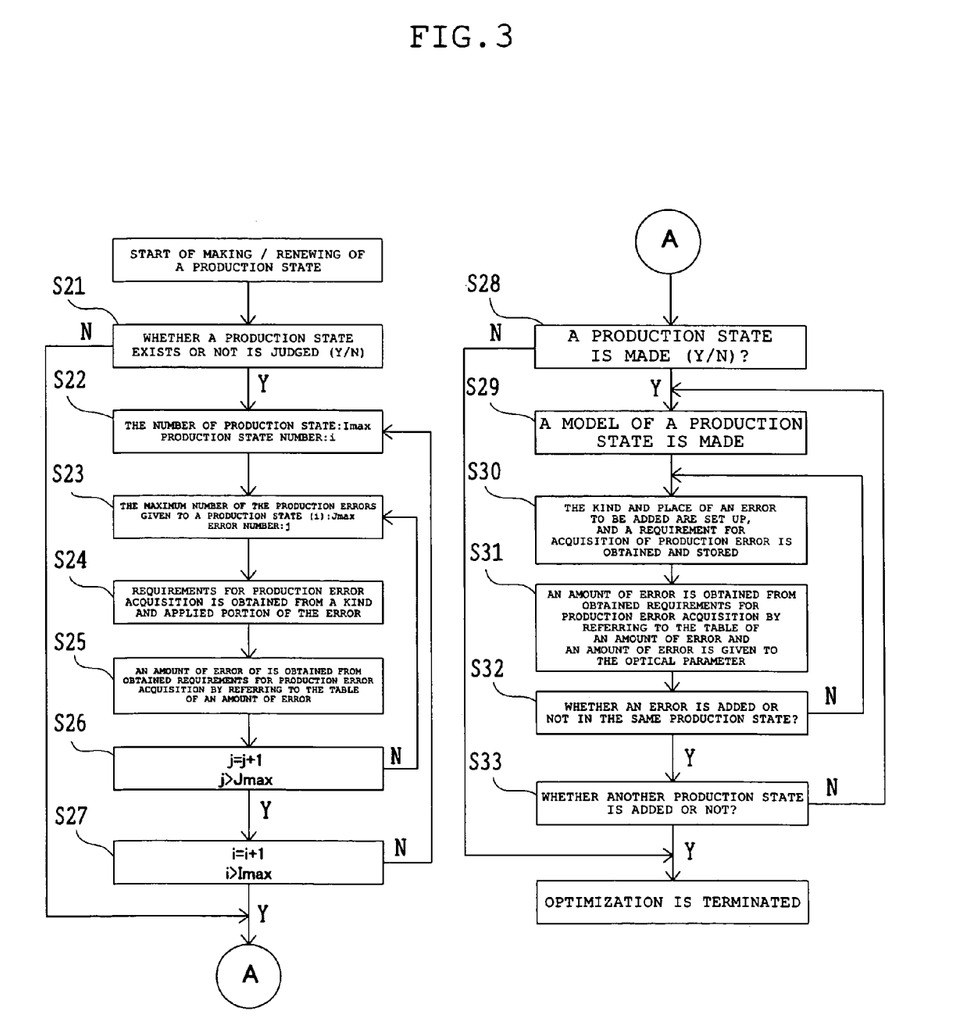
FIG. 3 is a flow chart showing a concrete processing procedure of a step for making/renewing of production state of a third embodiment of a design method of an optical system according to the present invention.

FIG. 3 shows a third embodiment of a design method of an optical system. Here, a concrete procedure of performing a step for making/renewing of production state is shown in a flow chart.

In the step for making/renewing of a production state in the present embodiment, firstly, whether the production state exists or not is judged (Step S21). When the production state is not made, processing after Step S28 mentioned later is carried out.

On the other hand, when the production state has been already made, renewing of the production state is carried out. Then, processing of Step S22-Step S27 is repeated by only the number of production states. Processing of Step S23-Step S26 is repeated by only the number of the production errors given to one production state. That is, in the step S22 the maximum number of the production state is stored in parameter Imax. Then, a production state that is an object of renewing is specified. Production state number i represents a production state that is the object of renewing, out of production states, the number of which is Imax.

In step S23, the maximum number of production error is stored in parameter Jmax. A production error at this time represents a production error given to a production state that is the object of renewing. Then, the production error that is the object of renewing is specified. Production error number $j$ represents a production error that is the object of renewing out of the production errors, the number of which is Jmax This production error number $j$ has the following information. It represents a kind of production error, a kind of optical parameter to which the production error is given, and a part where the production error is given in the optical parameter. For example, the following Table 3 shows that a production error number 1 means that the production error is Newton error, which is given to a radius of curvature and a first surface of an optical system.

TABLE 3

| Production error number: j | Kind of production error | Optical parameter | Portion applied |
| --- | --- | --- | --- |
| 1 | Newton number (lines) | Radius of curvature | First surface |
| 2 | Astigmatism | Radius of curvature | Second surface |
| ... | ... | ... | ... |
| J max | Thickness error | Center portion thickness | Third lens |

In step 24, a requirement for acquisition of production error is obtained and stored. This point will be explained. As mentioned above, the production error number j has the kind of production error, the kind of optical parameter, and the information about a portion applied. Therefore, from the information on the applied portion, a value of the optical parameter in the applied portion (for example, a value of the radius of curvature r of the first surface) can be known. That is, from the information on production error number $j$, requirements for obtaining production error which constitute an error table can be obtained.

In step S25, the table of an amount of error is referred to, based on the requirement for acquisition of production error obtained at the step 24, An amount of error obtained by referring is given as a new amount of error. That is, an amount of error is renewed.

In step S26, what added 1 to the present error number $j$, is considered as a new error number. Then, it is judged whether the new error number j exceeds the number of error Jmax or not. When the new number of error j exceeds the number of error Jmax, Step S27 is processed. On the other hand, when not exceeding, processing from the Step S23 is repeated. In step S27, what added 1 to the present error number $i$ is considered as a new error number. Then, it is judged whether the new error number $i$ exceeds the number of error Imax or not. When the new the number of error $i$ exceeds the number of error Imax, Step S28 is processed. On the other hand, when not exceeding, processing from the Step S22 is repeated.

Next, in step S28, it is judged whether a production state is to be made newly or not. When the production state is not made, a process for making/renewing of production state is terminated. On the other hand, when the production state is made, processing after the Step S28 is carried out.

In step S29, a model of the production state is made. Here, the model of the production state is a copy of a design state. That is, a value of optical parameter of the model in the design state is the same to a value of optical parameter of the design state. The production error is that a production error is added to a design state. Therefore, if the design state is one, the design state will be lost by adding a production error. Then, things having the same state as a design state, that is, many models are made. If such processing mentioned above is carried out, one design state can always remain.

Next, the kind and place of an error to be added are set up, and a requirement for acquisition of production error is obtained and stored (Step S30). Table 3 illustrated above is used for setting the kind and the place of the error to be added. Next, an amount of error is obtained with reference to the table of an amount of error from the acquired requirement for production error acquisition. Then, the amount of error is applied to the optical parameter in the model of the design state, and this is regarded as the present production state (Step S31)

Next, in an optical parameter in the present production state, it is judged whether other errors are to be added newly or not (Step S32).

When other errors are not added, processing from the following step S33 is carried out. On the other hand, when other errors are added, it returns to Step S30 and processing after the step is carried out again. In the step S33, furthermore, a new production state is made, that is, it is judged whether another production state is newly made or not.

When new production state is not made, a process for making/renewing of production state is terminated. On the other hand, when the production state is made, it returns to Step S29 and processing after the step is carried out again.

According to the process procedure of the making/renewing of production state in the third embodiment, renewing of an existing production state and giving of new production state can be simultaneously carried out efficiently. Therefore, a design can be efficiently carried out.

Fourth Embodiment

Figure 4:
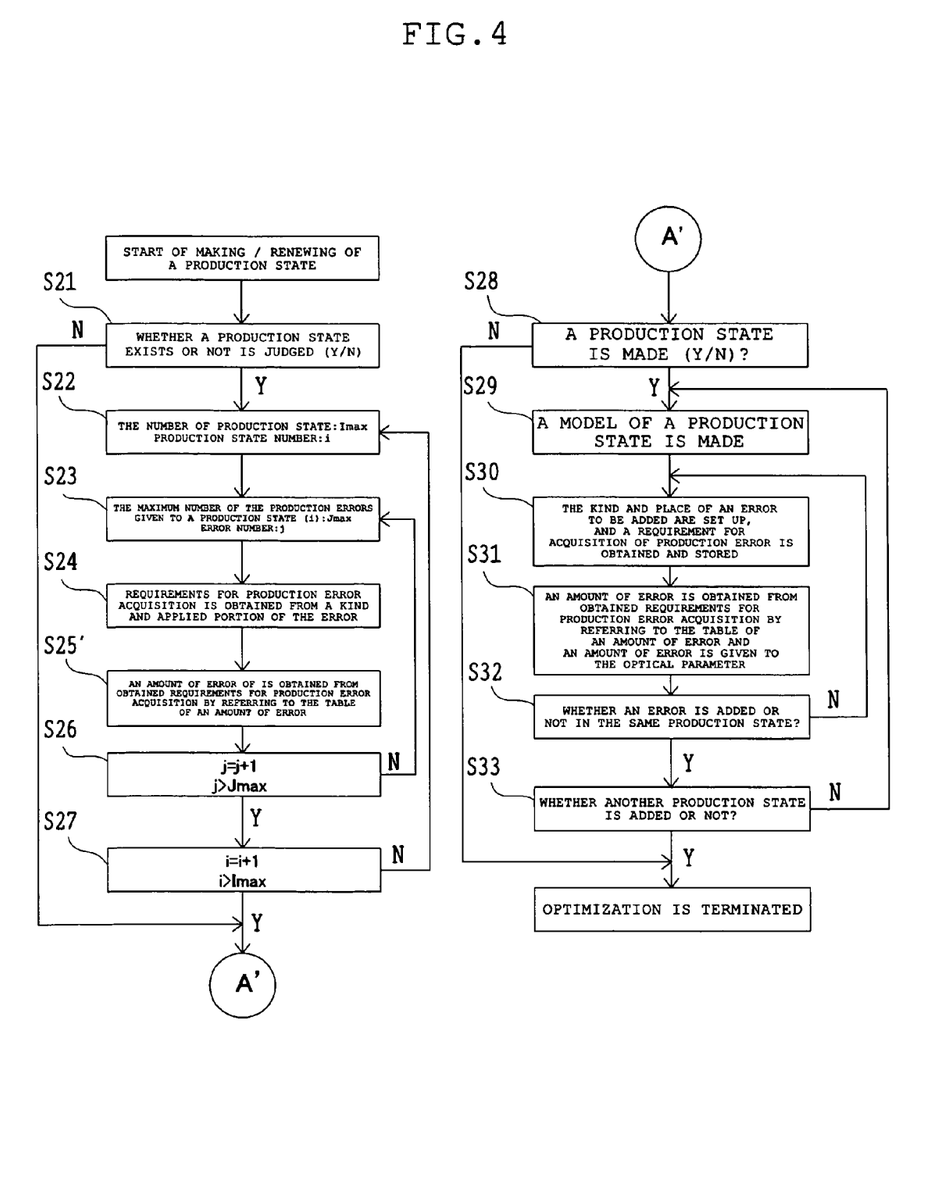
FIG. 4 is a flow chart showing a concrete processing procedure of a making/renewing of production error of the fourth embodiment of a design method of an optical system according to the present invention.

FIG. 4 shows a fourth embodiment of a design method of an optical system. Here, a concrete processing procedure of a step for making/renewing of production error is shown in a flow chart. The step for making/renewing of a production error of this embodiment is almost the same processing procedure in the third embodiment. However, in stead of step S25 in the third embodiment, a step (step S25') using an error DB recording the table of an amount of error is used.

In step S25', a requirement for obtaining a production error of a design state is inputted into a database from the kind and place of the error given. By this way, the amount of error which should be given is obtained from the data base, and a value of the present error is renewed.

According to the processing procedure for making/renewing of a production error of the fourth embodiment, reference of a table of an amount of error can be efficiently carried out using a computer. Therefore, giving newly a production state and renewing of the existing production state can be simultaneously carried out much more efficiently. Thus, a higher efficiency of design of an optical system can be obtained further.

Fifth Embodiment

A fifth embodiment of a design method of an optical system is shown. Here, an example in the case of determining for a production error sensitivity parameter is shown. In this embodiment, an example for obtaining a production error sensitivity parameter when a design state $N_0$, a production state $N_1$ and $N_2$ exist will be explained.

First, as to a design state $N_0$, optical performances $y_{01}$, $y_{02}$ - - - , $y_{0k}$ in conditions of 1, 2, - - - , k, are determined. Next, also as to production states $N_1$ and $N_2$, optical performances $y_{11}$ and $y_{12}$, - - - , $y_{1k}$, $y_{21}$ and $y_{22}$, - - - , $y_{2k}$ are determined similarly to the design state $N_0$.

This list is shown in Table 4.

TABLE 4

|  | 1 | 2 | ... | k |
|---|---|---|---|---|
| $N_0$ | $y_{01}$ | $y_{02}$ | ... | $y_{0k}$ |
| $N_1$ | $y_{11}$ | $y_{12}$ | ... | $y_{1k}$ |
| $N_2$ | $y_{21}$ | $y_{22}$ | ... | $y_{2k}$ |

As an optical performance here, there are aberration, spot RMS, MTF, light intensity, etc. As a condition factor, there are FNO, NA, an object distance, an image height, etc.

Now, after such data table has been made, the following parameters are calculated.

$$L1 = \Sigma y_{0j} y_{1j} = y_{01} y_{11} + y_{02} y_{2} + \ldots + y_{0k} y_{1k}$$

$$L2 = \Sigma y_{0j} y_{2j} = y_{01} y_{21} + y_{02} y_{22} + \ldots + y_{0k} y_{2k}$$

$$r = \Sigma y_{0j}^2 = y_{01}^2 + y_{02}^2 + \ldots + y_{0k}^2$$

$$S_T = \Sigma \Sigma y_{ij}^2 = y_{11}^2 + y_{12}^2 + \ldots + y_{1k}^2 + y_{21}^2 + y_{22}^2 + \ldots + y_{2k}^2$$

$$S_\beta = (L1 + L2)^2 / 2r$$

$$S_{N \times \beta} = (L1^2 + L2^2)/r - S_\beta$$

$$S_e = S_T - S_\beta - S_{N \times \beta}$$

$$f_e = 2k - 2$$

$$f_N = 2k - 1$$

$$V_e = S_e / f_e$$

$$V_N = (S_{N \times \beta} + S_e)/f_N$$

From the parameters mentioned above, a production error sensitivity parameter X is calculated as follows.

$$X = 10 \log\{(S_\beta - V_e)/V_N\}$$

Sixth Embodiment

A sixth embodiment of a design method of an optical system is shown.

Here also, another example in the case of determining for a production error sensitivity parameter is shown. In this embodiment, there are a state of a design state $N_0$, and production states $N_1$ and $N_2$. Furthermore, an error given to production states $N_1$ and $N_2$ has become $A+\delta$ to $N_1$, and $A-\delta$ to $N_2$. An example, in such case for obtaining a production error sensitivity parameter is shown.

First, as to a design state $N_0$, optical performances $y_{01}$, $y_{02}$ - - - , $y_{0k}$ in conditions of 1, 2, - - - , k, are determined. Next, also as to production states $N_1$ and $N_2$, optical performances $y'_{11}$ and $y'_{12}$, - - - , $y'_{1k}$, $y'_{21}$ and $y'_{22}$, - - - , $y'_{2k}$ are determined similarly to the design state $N_0$. These are listed in Table 5.

TABLE 5

|  | 1 | 2 | ... | k |
|---|---|---|---|---|
| $N_0$ | $y_{01}$ | $y_{02}$ | ... | $y_{0k}$ |
| $N_1$ | $y'_{11}$ | $y'_{12}$ | ... | $y'_{1k}$ |
| $N_2$ | $y'_{21}$ | $y'_{22}$ | ... | $y'_{2k}$ |

As to an optical performance here, there are aberrations, Spot RMS and MTF, light intensity, etc. As to conditioning, there are FNO, NA, an object distance, an image height, etc.

Now, after such data table has been made, the following parameters are calculated.

$$L1 = \Sigma y_{0j} y'_{1j} = y_{01} y'_{11} + y_{02} y'_{12} + \ldots + y_{0k} y'_{1k}$$

$$L2 = \Sigma y_{0j} y'_{2j} = y_{01} y'_{21} + y_{02} y'_{22} + \ldots + y_{0k} y'_{2k}$$

$$r = \Sigma y_{0j}^2 = y_{01}^2 + y_{02}^2 + \ldots + y_{0k}^2$$

$$S_T = \Sigma \Sigma y'_{ij}^2 = y'_{11}^2 + y'_{12}^2 + \ldots + y'_{1k}^2 + y'_{21}^2 + y'_{22}^2 + \ldots + y'_{2k}^2$$

$$S_\beta = (L1 + L2)^2 / 2r$$

$$S_{N \times \beta} = (L1^2 + L2^2)/r - S_\beta$$

$$S_e = S_T - S_\beta - S_{N \times \beta}$$

$$f_e = 2k - 2$$

$$f_N = 2k - 1$$

$$V_e = S_e / f_e$$

$$V_N = (S_{N \times \beta} + S_e)/f_N$$

From the parameters mentioned above, a production error sensitivity parameter X is calculated as follows.

$$X = 10 \log\{(S_\beta - V_e)/V_N\}$$

Seventh Embodiment

A seventh embodiment of a design method of an optical system is shown. Here also, another example in the case of determining for a production error sensitivity parameter is shown.

In this embodiment, an example for obtaining a production error sensitivity parameter when a design state $N_0$ and a production state $N_1$ exist will be explained. First, as to a design state $N_0$, optical performances $y_{01}$, $y_{02}$ - - - , $y_{0k}$ in conditions of 1, 2, - - - , k, are determined. Next, also as to production states $N_1$, optical performances $y'_{11}$ and $y'_{12}$, - - - , $y'_{1k}$, are determined similarly to the design state $N_0$. An error of $A+\delta$ is given in the production state $N_1$. Here, since an amount of error is minute, a performance of the production state $N_2$ when an error of $A-\delta$ is given can be presumed. Thus, as to a production state $N_2$, an optical performance $y''_{21}$ and $y''_{22}$, - - - , $y''_{2k}$ can be determined as $y''_{2j} = 2 y_{02} - y'_{1j}$. These are listed in Table 6.

TABLE 6

|   | 1 | 2 | ... | k |
|---|---|---|-----|---|
| $N_0$ | $y_{01}$ | $y_{02}$ | ... | $y_{0k}$ |
| $N_1$ | $y'_{11}$ | $y'_{12}$ | ... | $y'_{1k}$ |
| $N_2$ | $y''_{21}$ | $y''_{22}$ | ... | $y''_{2k}$ |

As an optical performance here, there are aberrations, spot RMS, MTF, light intensity, etc. and in conditioning, there are FNO, NA, an object distance, an image height, etc.

Now, after such data table have been made, the following parameters are calculated.

$$L1 = \Sigma y_{0j} y'_{1j} = y_{01} y'_{11} + y_{02} y'_{12} + \ldots + y_{0k} y'_{1k}$$

$$L2 = \Sigma y_{0j} Y''_{2j} = y_{01} y''_{21} + y_{02} y''_{22} + \ldots + y_{0k} y''_{2k}$$

$$r = \Sigma y_{0j}^2 = y_{01}^2 + y_{02}^2 + \ldots + y_{0k}^2$$

$$S_T = \Sigma \Sigma y_{ij}^2 = y'^2_{11} + y'^2_{12} + \ldots + y'^2_{1k} + y''^2_{21} + y''^2_{22} + \ldots + y''^2_{2k}$$

$$S_\beta = (L1 + L2)^2 / 2r$$

$$S_{N \times \beta} = (L1^2 + L2^2)/r - S_\beta$$

$$S_e = S_T - S_\beta - S_{N \times \beta}$$

$$f_e = 2k - 2$$

$$f_N = 2k - 1$$

$$V_e = S_e / f_e$$

$$V_N = (S_{N \times \beta} + S_e)/f_N$$

From the parameters mentioned above, a production error sensitivity parameter X is as follows.

$$X = 10 \log\{(S_\beta - V_e)/V_N\}$$

Figure 5:
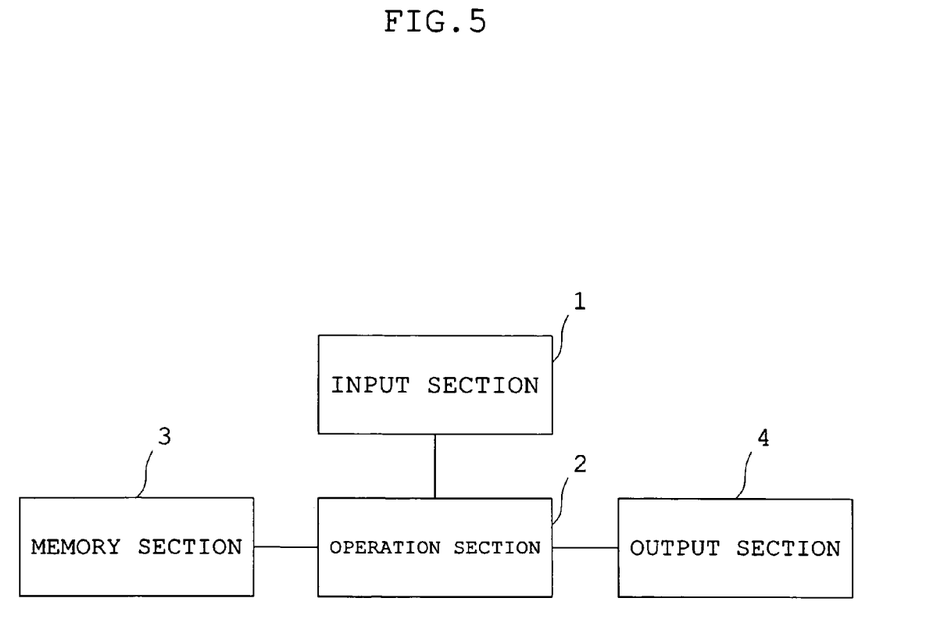
FIG. 5 is a block diagram showing a constitution of a processing apparatus for implementing a design method of the optical system of the present invention.

FIG. 5 is a diagram showing a constitution of a processing apparatus for carrying out a method of the present invention. It consists of an input section 1 which inputs information required for this design method, an operation section 2 which carries out an operation required for the design method of the present invention, a memory section 3 which memorizes a result processed by this operation section 2, and an output section 4 which outputs an operation result in a form which can be understood by a designer Information inputted from the input section 1 is once transmitted to the operation section 3, and a classification and a value of information are judged, and the information is stored at the memory section 3 if needed. In the memory section 3, contents of the memory section 3 are stored in a specific domain of the memory section 3 by instruction of the operation section 2. In the operation section 2, according to the running stage of this method, required information is called from the memory section 3 and operation is carried out and the execution result is stored in the memory section 3. Finally, as a result of application of this method, obtained information is called from the memory section 3, and it is transmitted to the output section after having processed into a state which can be understood by a designer at the operation section 2. In the output section 4, an output is shown to the designer, based on the information transmitted from the operation section 3.

Next, an example where a method of the present invention is actually implemented by this constitution will be explained by using the first embodiment. First, as a preparation for start of a flow in the first embodiment, a various kind of information, such as an amount of error that is unchanged during implementation of this method, is inputted from the input part 1, and the information is stored in an exclusive storage domain for keeping a various kind of information in the memory section 3.

At step 2, the optical parameter and an amount of error DB of a design state are called to the operation section 2. In the operation part 2, while referring to information of the amount of error DB to each of optical parameters, an optical parameter in a production state is made, otherwise, an optical parameter in an existing production state is renewed.

At step 3, a parameter of an evaluation function and its assigned weight are inputted from the input part 1, and an evaluation function is made, based on a parameter of the evaluation function inputted by the operation section 2 and the assigned weight. The valuation function made by the operation section 2 is stored in the valuation function storage domain of the memory section 3.

At step 4, the optical parameter of a design state, the optical parameter of a production state in the memory section 3, and an evaluation function are called to the operation section 2, and then an operation of optimization is carried out, based on the evaluation function called in the operation section 2. The optical parameter of a design state and the optical parameter of a production state obtained are stored in each domain of a memory section 3, and information is renewed.

At step 5, the optical parameter of a design state, the optical parameter of a production state in the memory section 3, and an evaluation function are called to the operation section 2, and then information from the optical parameter of a design state or the optical parameter of a production state are processed so that it may become an information output form defined beforehand, and then these are transmitted to an output section 4. In the output section 4, the information is shown to a designer, based on the processed information.

The designer judges whether these have become a desired specification and performance, based on the information shown by the output section 4. A design will be completed if it becomes within a range of the specification and the performance for which the designer requires. If it is not within the range of the desired specification and the performance, it returns to Step 2 or Step 3, and the procedure mentioned above is repeated again.

The invention claimed is:

1. A processing apparatus comprising:
an operation section configured to perform an operation in accordance with a method of designing an optical system using an evaluation function;
an input section which inputs information required for the operation;
an output section which outputs an operation results; and
a memory section which memorizes the operation result,
wherein the method of designing an optical system comprises:
setting an initial-value that sets a value of an optical parameter in a design state where a production error has not been taken into consideration,
generating an evaluation function,
performing optimization by determining an optimal value of an optical parameter in a production state, which is produced by adding a production error to the optical parameter in the design state, by using the evaluation function, and
renewing a production state by renewing the production error included in the optimal value of the optical parameter in the production state that has been determined by the performing optimization, to determine a new value of the optical parameter in the production state.

2. The processing apparatus according to claim 1, wherein:
in the renewing the production state, an amount of the production error to be applied is acquired on a basis of a value in an error-amount table, which has been preliminarily prepared according to a requirement for acquisition of an amount of a production error, and the amount of the production error as acquired is used for renewal of the production error included in the optical parameter in the production state.

3. The processing apparatus according to claim 1, wherein:
in the generating evaluating-function, at least one parameter representing sensitivity to production error, which parameter is defined by optical performance in the design state and optical performance in the production state, is incorporated as an evaluation parameter in the evaluation function.

4. A processing apparatus comprising:
an operation section for performing an operation in accordance with a method of designing an optical system;
an input section which inputs information required for the operation;
an output section which outputs an operation results; and
a memory section which memorized the operation result,
wherein the method of designing an optical system comprises:
  setting initial-value which sets up a value in a design state as a value of an optical parameter,
  generating a production-state which sets a value in a production state as a value of the optical parameter,
  generating an evaluation fuction using the production state as variable, and
  performing optimization by optimizing the value in the production state using the evaluation function,
  wherein, in the gnerating the production state, the value in the production state is set up by adding a predetermined amount of production error, which is determined on a basis of a value in an error-amount table, to the value in the design state.

5. The processing apparatus according to calim 4, wherein values in the error-amount table are set on a basis of actual production capability.

6. The processing apparatus according to claim 4, wherein the error-amount table is composed as a combination of one or more production errors and one or more optical parameters.

7. The processing apparatus according to claim 4, wherein the error-amount table contains one or more production errors including at least one of Newton error, astigmatism, wall thickness error, tilt eccentricity, and shift eccentricity.

8. The processing apparatus according to claim 4, wherein the error-amount table contains one or more optical parameters including at least one of radius of curvature, lens thickness, and interlens interval.

9. the processing apparatus according to claim 4, wherein a possible range of an optical parameter is divided into two or more numerical value ranges in the error-amount table.

10. The processingapparatus according to claim 9, wherein an amount of error is set for each of the two or more numerical value ranges in the error-amount table.

11. The processing apparatus according to claim 4, further comprising a renewing the production-state that renews the amount of the production error to a new value in accordance with a change of the value of the optical parameter in a design state, on a basis of the error-amount table.

12. The processing apparatus according to claim 1, wherein the performing optimization and the renewing a production state are iterated.

* * * * *